US011962088B2

(12) United States Patent
Huang et al.

(10) Patent No.: US 11,962,088 B2
(45) Date of Patent: Apr. 16, 2024

(54) DUAL-MODE ORBITAL ANGULAR MOMENTUM (OAM) BASE CELL ARRAY AND METASURFACE PREPARATION METHOD

(71) Applicant: Anhui University, Hefei (CN)

(72) Inventors: Zhixiang Huang, Hefei (CN); Junjie Han, Hefei (CN); Jie Wu, Hefei (CN)

(73) Assignee: Anhui University, Hefei (CN)

( * ) Notice: Subject to any disclaimer, the term of this patent is extended or adjusted under 35 U.S.C. 154(b) by 136 days.

(21) Appl. No.: 17/839,876

(22) Filed: Jun. 14, 2022

(65) Prior Publication Data

US 2023/0231315 A1 Jul. 20, 2023

(30) Foreign Application Priority Data

Jan. 14, 2022 (CN) ......................... 202210041244.9

(51) Int. Cl.
*H01Q 15/00* (2006.01)
*H01Q 1/38* (2006.01)
*H01Q 1/50* (2006.01)

(52) U.S. Cl.
CPC ........... *H01Q 15/0086* (2013.01); *H01Q 1/38* (2013.01); *H01Q 1/50* (2013.01)

(58) Field of Classification Search
CPC ............ H01Q 1/38; H01Q 1/243; H01Q 1/50; H01Q 7/00; H01Q 1/36; H01Q 21/28; H01Q 1/48; H01Q 1/246; H01Q 9/42; H01Q 9/0407; H01Q 1/22; H01Q 1/42; H01Q 21/065; H01Q 21/24; H01Q 1/24; H01Q 9/0421; H01Q 1/2225; H01Q 23/00; H01Q 1/44; H01Q 13/10; H01Q 1/2283; H01Q 3/26; H01Q 1/273; H01Q 1/242; H01Q 21/30; H01Q 21/08; H01Q 3/24; H01Q 5/371; H01Q 1/52; H01Q 1/3275; H01Q 9/16; H01Q 1/12; H01Q 1/521; H01Q 1/3233; H01Q 21/0006; H01Q 21/00; H01Q 9/285; H01Q 21/061; H01Q 9/0414; H01Q 1/40; H01Q 9/30; H01Q 25/00; H01Q 5/378; H01Q 1/526; H01Q 1/2208; H01Q 1/2216; H01Q 21/29; H01Q 9/40;

(Continued)

(56) References Cited

U.S. PATENT DOCUMENTS 10,983,194 B1 * 4/2021 Patel ........................ H01Q 1/28

FOREIGN PATENT DOCUMENTS

EP 2696225 A1 * 2/2014 ............ G02B 1/002

* cited by examiner

*Primary Examiner* — Monica C King
(74) *Attorney, Agent, or Firm* — Reising Ethington P.C.

(57) ABSTRACT

The present disclosure provides a dual-mode orbital angular momentum (OAM) convergence base cell array and metasurface preparation method. The base cell array includes $2^n(2^n-1)$ anisotropic cell structures and $2^n$ isotropic cell structures. Each of the anisotropic cell structures includes a bottom ground layer, a dielectric substrate layer and a top pattern layer which are disposed in sequence from bottom to top, where each top pattern layer has an axisymmetric H-shaped structure. Each of the isotropic cell structures includes a bottom ground layer, a dielectric substrate layer and a top pattern layer which are disposed in sequence from bottom to top, where each top pattern layer has a square structure.

18 Claims, 6 Drawing Sheets

(58) Field of Classification Search

CPC ...... H01Q 3/08; H01Q 21/064; H01Q 1/2291; H01Q 5/40; H01Q 1/1271; H01Q 15/14; H01Q 1/32; H01Q 3/36; H01Q 1/241; H01Q 17/00; H01Q 11/08; H01Q 9/0442; H01Q 5/50; H01Q 21/06; H01Q 3/267; H01Q 1/125; H01Q 19/10; H01Q 9/28; H01Q 9/045; H01Q 3/2605; H01Q 1/02; H01Q 1/288; H01Q 15/0086; H01Q 21/26; H01Q 7/06; H01Q 1/362; H01Q 1/523; H01Q 9/0457; H01Q 13/02; H01Q 13/08; H01Q 5/335; H01Q 21/062; H01Q 21/205; H01Q 1/28; H01Q 1/245; H01Q 1/2266; H01Q 21/0025; H01Q 1/244; H01Q 3/30; H01Q 9/26; H01Q 5/10; H01Q 13/106; H01Q 3/34; H01Q 21/0087; H01Q 1/1207; H01Q 7/08; H01Q 5/307; H01Q 21/0075; H01Q 3/02; H01Q 5/357; H01Q 1/084; H01Q 9/04; H01Q 13/18; H01Q 21/22; H01Q 1/46; H01Q 9/065; H01Q 5/321; H01Q 3/04; H01Q 5/35; H01Q 19/062; H01Q 5/328; H01Q 1/3291; H01Q 1/1242; H01Q 21/20; H01Q 3/44; H01Q 1/3283; H01Q 3/40; H01Q 5/00; H01Q 15/08; H01Q 9/27; H01Q 3/46; H01Q 1/2258; H01Q 19/06; H01Q 5/20; H01Q 5/364; H01Q 1/1235; H01Q 1/1214; H01Q 1/08; H01Q 9/0428; H01Q 19/005; H01Q 3/32; H01Q 25/001; H01Q 1/3241; H01Q 1/422; H01Q 5/30; H01Q 15/0013; H01Q 5/385; H01Q 15/24; H01Q 21/245; H01Q 15/02; H01Q 1/04; H01Q 15/16; H01Q 19/30; H01Q 9/0485; H01Q 9/0435; H01Q 1/007; H01Q 5/42; H01Q 5/28; H01Q 1/225; H01Q 1/1257; H01Q 1/1228; H01Q 3/28; H01Q 5/25; H01Q 19/17; H01Q 13/085; H01Q 7/005; H01Q 1/34; H01Q 21/005; H01Q 1/10; H01Q 19/108; H01Q 1/247; H01Q 1/325; H01Q 1/27; H01Q 1/364; H01Q 1/2241; H01Q 3/00; H01Q 1/1278; H01Q 9/36; H01Q 17/008; H01Q 1/248; H01Q 1/002; H01Q 25/002; H01Q 19/13; H01Q 1/525; H01Q 9/32; H01Q 1/2275; H01Q 13/22; H01Q 25/007; H01Q 13/20; H01Q 5/314; H01Q 1/00; H01Q 3/005; H01Q 3/2676; H01Q 15/006; H01Q 3/247; H01Q 19/19; H01Q 13/206; H01Q 25/02; H01Q 1/1221; H01Q 13/06; H01Q 9/14; H01Q 19/08; H01Q 3/38; H01Q 3/06; H01Q 9/145; H01Q 3/22; H01Q 19/104; H01Q 13/203; H01Q 15/0026; H01Q 1/18; H01Q 13/16; H01Q 19/12; H01Q 3/2611; H01Q 3/20; H01Q 1/085; H01Q 9/0464; H01Q 25/005; H01Q 17/001; H01Q 5/45; H01Q 21/0043; H01Q 1/103; H01Q 5/48; H01Q 13/28; H01Q 7/04; H01Q 21/293; H01Q 25/04; H01Q 1/20; H01Q 13/24; H01Q 15/161; H01Q 1/088; H01Q 15/002; H01Q 15/18; H01Q 21/0037; H01Q 1/286; H01Q 21/0031; H01Q 17/004; H01Q 19/132; H01Q 3/01; H01Q 3/2682; H01Q 1/005; H01Q 1/1264; H01Q 13/103; H01Q 19/106; H01Q 1/405; H01Q 5/392; H01Q 3/242; H01Q 1/3208; H01Q 15/141; H01Q 15/008; H01Q 25/008; H01Q 3/2658; H01Q 9/265; H01Q 13/0258; H01Q 21/10; H01Q 3/14; H01Q 3/18; H01Q 21/0012; H01Q 15/242; H01Q 1/425; H01Q 21/0093; H01Q 15/244; H01Q 21/067; H01Q 15/148; H01Q 1/06; H01Q 19/28; H01Q 13/00; H01Q 11/10; H01Q 9/44; H01Q 3/2617; H01Q 21/12; H01Q 1/1285; H01Q 19/32; H01Q 15/0066; H01Q 15/10; H01Q 15/0006; H01Q 1/3266; H01Q 1/2233; H01Q 1/281; H01Q 19/18; H01Q 1/528; H01Q 9/18; H01Q 1/3216; H01Q 17/007; H01Q 3/12; H01Q 9/0471; H01Q 19/134; H01Q 1/421; H01Q 13/0208; H01Q 17/002; H01Q 15/142; H01Q 15/00; H01Q 1/285; H01Q 1/3225; H01Q 9/38; H01Q 3/446; H01Q 19/185; H01Q 15/147; H01Q 5/55; H01Q 19/193; H01Q 5/22; H01Q 9/20; H01Q 9/06; H01Q 19/00; H01Q 19/192; H01Q 3/245; H01Q 13/12; H01Q 19/09; H01Q 19/195; H01Q 13/0275; H01Q 13/025; H01Q 19/021; H01Q 1/14; H01Q 15/23; H01Q 19/02; H01Q 3/42; H01Q 1/287; H01Q 13/0241; H01Q 21/0018; H01Q 21/068; H01Q 15/22; H01Q 15/20; H01Q 15/0053; H01Q 5/49; H01Q 11/14; H01Q 5/47; H01Q 11/04; H01Q 13/0283; H01Q 3/16; H01Q 19/191; H01Q 17/005; H01Q 19/22; H01Q 21/0081; H01Q 9/24; H01Q 19/24; H01Q 19/175; H01Q 15/246; H01Q 15/162; H01Q 1/30; H01Q 5/15; H01Q 1/26; H01Q 13/26; H01Q 15/04; H01Q 3/10; H01Q 1/368; H01Q 9/22; H01Q 13/0233; H01Q 1/087; H01Q 3/2647; H01Q 11/12; H01Q 1/428; H01Q 13/04; H01Q 1/081; H01Q 1/3258; H01Q 11/105; H01Q 5/342; H01Q 3/2629; H01Q 3/2635; H01Q 13/065; H01Q 15/145; H01Q 3/2694; H01Q 11/083; H01Q 7/02; H01Q 15/168; H01Q 19/065; H01Q 1/366; H01Q 9/00; H01Q 9/0478; H01Q 1/283; H01Q 15/0033; H01Q 3/443; H01Q 1/427; H01Q 9/0492; H01Q 25/004; H01Q 1/424; H01Q 13/0266; H01Q 19/26; H01Q 9/46; H01Q 11/02; H01Q 13/0225; H01Q 3/385; H01Q 15/12; H01Q 9/34; H01Q 15/0046; H01Q 1/282; H01Q 21/0068; H01Q 1/276; H01Q 1/16; H01Q 15/0093; H01Q 15/165; H01Q 11/06; H01Q 15/144; H01Q 19/028; H01Q 19/102; H01Q 19/04; H01Q 1/185; H01Q 15/163; H01Q 19/138; H01Q 21/0056; H01Q 3/2652; H01Q 15/06; H01Q 3/2664; H01Q 19/15; H01Q 9/005; H01Q 19/067; H01Q 15/248; H01Q 19/026; H01Q 21/296; H01Q 11/086; H01Q 21/0062; H01Q 15/004; H01Q 1/106; H01Q 3/2623; H01Q 13/0291; H01Q 19/136; H01Q 19/022; H01Q 15/166; H01Q 19/025; H01Q 19/023; H01Q 1/082; H01Q 15/0073; H01Q 19/027; H01Q 1/1292;

H01Q 11/16; H01Q 21/225; H01Q 9/02; H01Q 15/167; H01Q 9/08; H01Q 21/14; H01Q 3/2641; H01Q 9/12; H01Q 13/0216; H01Q 19/20; H01Q 9/43; H01Q 11/18; H01Q 9/10; H01Q 21/18; H01Q 11/20; H01Q 3/2688; H01Q 21/16; G02B 1/002

See application file for complete search history.

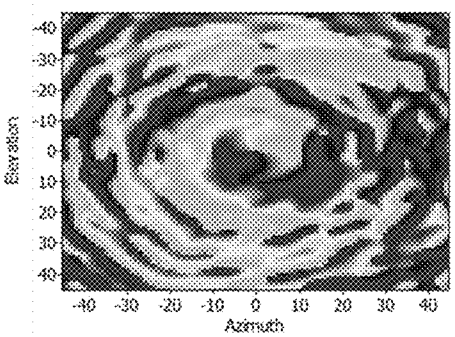
FIG. 8(a)
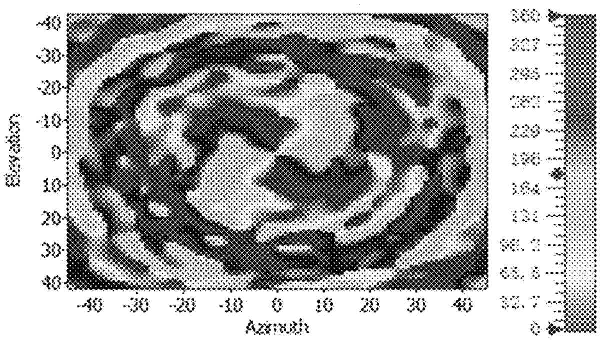
FIG. 8(b)
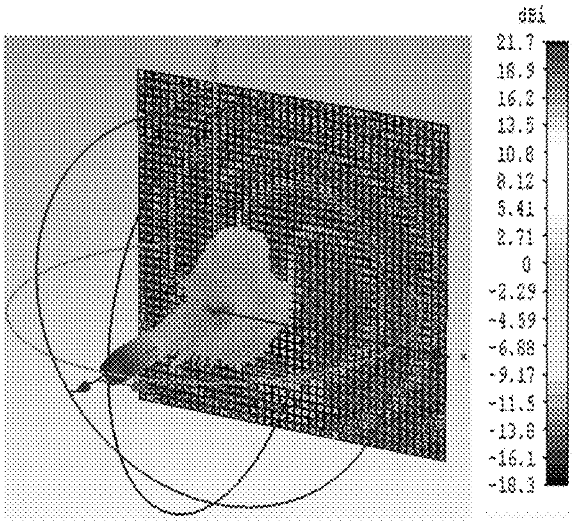
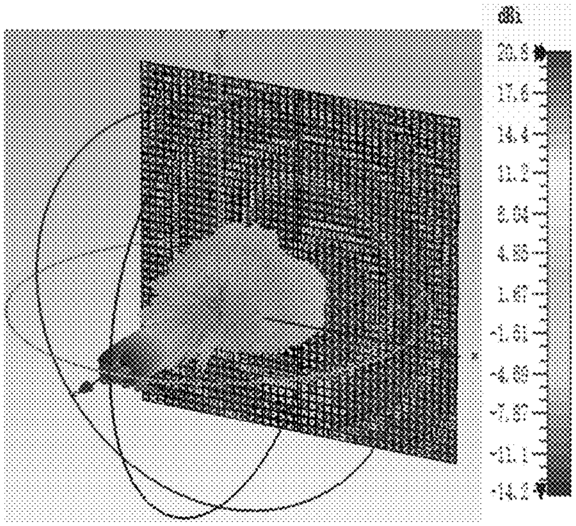
FIG. 9(a)
FIG. 9(b)

DUAL-MODE ORBITAL ANGULAR MOMENTUM (OAM) BASE CELL ARRAY AND METASURFACE PREPARATION METHOD

CROSS REFERENCE TO RELATED APPLICATION

This patent application claims the benefit and priority of Chinese Patent Application No. 202210041244.9, filed on Jan. 14, 2022, the disclosure of which is incorporated by reference herein in its entirety as part of the present application.

TECHNICAL FIELD

The present disclosure relates to the field of communication technologies related to electronic materials, in particular to a dual-mode orbital angular momentum (OAM) base cell array and metasurface preparation method.

BACKGROUND ART

With the rapid evolution and development of science and technology, channel capacity in the field of communication technologies has nearly reached the limit. Currently, due to the limitation in frequency spectra and polarization resources, the process of further improving transmission rate has encountered numerous challenges. Nowadays, the field of wireless communication has revealed a growing trend of lower profile, smaller size and multifunctionality. It is a matter of great urgency to seek a powerful communication system featuring strong antijamming capacity, high and stable communication rate, and more reasonable utilization of limited spectrum resources. Therefore, a novel wireless transmission technology with the characteristic of angular momentum of electromagnetic waves has become a research hotspot. Based on orthogonality of OAM in different modes, larger channel capacity can be achieved; and moreover, with high spectral efficiency and antijamming capability in communication, vortex electromagnetic waves have been widely used in the field of radio communication, optical communication and quantum communication.

In classical electromagnetic theory, angular momentum is classified into spin angular momentum (SAM) and OAM. Similar to SAM, OAM is also one of fundamental physical quantities of electromagnetic waves. The linear polarization, circular polarization and elliptical polarization arising from electron spin belong to SAM, while those related to spatial distribution belong to OAM, which is the representative characteristic of vortex waves. The OAM modes with different topological charges are mutually orthogonal.

The following solutions are usually adopted for the generation of OAM, such as spiral phase plates, array antennas, Q plates and spiral-structured fiber bragg grating. Most of the above solutions require high-precision manufacturing processes, and the large volume adds to the complexity of the system, limiting the proper use in practice.

In recent years, metasurface has drawn wide attention from researchers at home and abroad. With the advantages of low profile, small size, light weight, ease of manufacture and so on, devices constructed by the metasurface have found an increasingly wide application in various fields. The vortex beams with OAM produced at microwave frequency and millimeter wave frequency have once become a research hotspot. Different from electromagnetic metamaterials, metasurfaces can be used as two-dimensional equivalents of metamaterials, that is, two-dimensional planar material structures. Through the design of different cell structure shapes and arrangement modes, the amplitude, phase, polarization and propagation of electromagnetic waves can be effectively regulated. However, existing metasurfaces prepared based on a base cell have problems of monotonous function and notable divergence of OAM beams produced. In view of this, how to improve base cells constituting a metasurface has become an urgent technical problem to be solved in the art.

SUMMARY

The present disclosure aims to provide a dual-mode OAM base cell array and metasurface preparation method, so as to achieve dual-mode polarization regulation.

To achieve the foregoing objective, the present disclosure provides a dual-mode OAM convergence base cell array, where the base cell array includes $2^n(2^n-1)$ anisotropic cell structures and $2^n$ isotropic cell structures; and the base cell array has an array structure of $2^n \times 2^n$, n denoting a bit number;

each of the anisotropic cell structures includes a bottom ground layer, a dielectric substrate layer and a top pattern layer which are disposed in sequence from bottom to top, the top pattern layer of the anisotropic cell structure having an axisymmetric H-shaped structure; and each of the isotropic cell structures includes a bottom ground layer, a dielectric substrate layer and a top pattern layer which are disposed in sequence from bottom to top, the top pattern layer of the isotropic cell structure having a square structure.

Optionally, different anisotropic cell structures have different H-shaped structure parameters.

Optionally, the bottom ground layer and the top pattern layer in each of the anisotropic cell structures and the bottom ground layer and the top pattern layer in each of the isotropic cell structures are all made of metal materials, and the dielectric substrate layer in each of the anisotropic cell structures and the dielectric substrate layer in each of the isotropic cell structures are both made of a material with a dielectric constant of 2.65.

Optionally, the bottom ground layer and the dielectric substrate layer in each of the anisotropic cell structures have a same cycle length, and the bottom ground layer and the dielectric substrate layer in each of the isotropic cell structures have a same cycle length.

The present disclosure further provides a dual-mode OAM convergence metasurface preparation method, including:

- determining, by optimization, optimal parameters corresponding to various bit states of each of $2^n$ $(2^n-1)$ anisotropic cell structures in two polarization directions based on a phase requirement of OAM for the anisotropic cell structures, where n denotes a bit number;
- constructing the $2^n$ $(2^n-1)$ anisotropic cell structures according to the optimal parameters corresponding to various bit states of the $2^n$ $(2^n-1)$ anisotropic cell structures in two polarization directions;
- determining, by optimization, optimal parameters corresponding to $2^n$ isotropic cell structures based on a phase requirement of OAM for the isotropic cell structures;
- constructing $2^n$ isotropic cell structures according to the optimal parameters corresponding to the 2 n isotropic cell structures;

constructing, based on the $2^n$ $(2^n-1)$ anisotropic cell structures and the $2^n$ isotropic cell structures, the base cell array described above;

deriving a compensation phase of each base cell array of convergent vortex beams from free-space Helmholtz equation; and constructing, based on the compensation phase of each of the base cell arrays, an OAM convergence metasurface carrying different topological charges by MATLAB.

Optionally, the determining, by optimization, optimal parameters corresponding to various bit states of each of $2^n$ $(2^n-1)$ anisotropic cell structures in two polarization directions based on a phase requirement of OAM for the anisotropic cell structures specifically includes:

conducting, by three-dimensional electromagnetic field simulation software CST, rough simulation on each of the anisotropic cell structures in two polarization directions to obtain a first rough phase value;

conducting fine-tuning based on the first rough phase value until a first precise phase value is reached; and taking dimension parameters corresponding to the first precise phase value as optimal parameters of the anisotropic cell structure.

Optionally, the determining, by optimization, optimal parameters corresponding to $2^n$ isotropic cell structures based on a phase requirement of OAM for the isotropic cell structures specifically includes:

conducting, by three-dimensional electromagnetic field simulation software CST, rough simulation on each of the isotropic cell structures to obtain a second rough phase value;

conducting fine-tuning based on the second rough phase value until a second precise phase value is reached; and taking dimension parameters corresponding to the second precise phase value as optimal parameters of each of the isotropic cell structures.

Optionally, the conducting fine-tuning based on the first rough phase value until a first precise phase value is reached is conducted according to the following formula:

$$\phi_{ith}^{a} = \begin{cases} 0°, 337.5° < \phi_{ith} \le 360°, 0° < \phi_{ith} \le 22.5° \\ 45°, 22.5° < \phi_{ith} \le 67.5° \\ 90°, 67.5° < \phi_{ith} \le 112.5° \\ \vdots \\ 315°, 292.5° < \phi_{ith} \le 337.5° \end{cases}$$

where $\phi$ith denotes the first rough phase value, and $\phi_{ith}{}^{a}$ denotes the first precise phase value.

Optionally, deriving a compensation phase of each base cell array of convergent vortex beams from free-space Helmholtz equation is conducted according to the following formula:

$$\varphi=2\pi(\sqrt{(x^2+y^2)+F^2}-F)/\lambda+L\cdot \arctan(y/x)$$

where, $\varphi$ denotes a compensation phase of each of the base cell arrays of convergent vortex beams, $\lambda$ denotes wavelength in free space, L denotes topological charges of OAM, F denotes focal length, and x and y denote position coordinates corresponding to a coding array, respectively.

According to the specific embodiments provided by the present disclosure, the present disclosure discloses the following technical effects:

The present disclosure provides a dual-mode OAM convergence base cell array and metasurface preparation method. The base cell array includes $2^n(2^n-1)$ anisotropic cell structures and $2^n$ isotropic cell structures, where the base cell array has an array structure of $2^n \times 2^n$, n denoting a bit number. Each of the anisotropic cell structures includes a bottom ground layer, a dielectric substrate layer and a top pattern layer which are disposed in sequence from bottom to top, where each top pattern layer has an axisymmetric H-shaped structure. Each of the isotropic cell structures includes a bottom ground layer, a dielectric substrate layer and a top pattern layer which are disposed in sequence from bottom to top, where each top pattern layer has a square structure. According to the present disclosure, a polarization-regulated dual-mode OAM convergence base cell array is constructed by disposing a plurality of anisotropic cell structures and a small quantity of isotropic cell structures, and subsequently, the base cell array can be used to construct a metasurface. In addition, OAM beams can be converged by constructing the metasurface using the base cell array.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. A person of ordinary skill in the art may further obtain other accompanying drawings based on these accompanying drawings without creative labor.

FIG. 2(*a*) shows a top view of an anisotropic cell structure, and FIG. 2(*b*) shows a front view of an anisotropic cell structure;

FIG. 3(*a*) shows a top view of an isotropic cell structure 2, and FIG. 3(*b*) shows a front view of an isotropic cell structure 2;

FIG. 5. FIGS. 5(*a*), 5(*b*) and 5(*c*) show the input phase distribution diagram, output phase distribution diagram and compensation phase distribution diagram of the OAM convergence metasurface under x polarization incidence of electromagnetic waves, respectively, and the topological charges carried by the metasurface are at 1st order. FIGS. 5(*e*) and 5(*f*) show the input phase distribution diagram, output phase distribution diagram and compensation phase distribution diagram of the OAM convergence metasurface under y polarization incidence of electromagnetic waves, respectively, and the topological charges carried by the metasurface are at 2nd order;

FIGS. 6(*a*) and 6(*b*) show the two-dimensional far-field scattering diagrams drawn on the yoz plane based on the OAM convergence metasurfaces carrying topological charges 1 and 2, respectively;

FIGS. 7(*a*) and 7(*b*) are the schematic diagrams illustrating amplitude results of the OAM convergence metasurface carrying topological charges 1 and 2 against the xoy plane at the position of 246 mm from Z-axis, respectively;

FIG. 8 is a schematic diagram illustrating phase results corresponding to the polarization-regulated dual-mode OAM convergence metasurface according to the present disclosure; FIGS. 8(*a*) and 8(*b*) are the schematic diagrams illustrating phase results corresponding to the OAM convergence metasurfaces carrying topological charges 1 and 2, respectively; and FIG. 9 is a three-dimensional far-field scattering diagram of the polarization-regulated dual-mode OAM convergence metasurface according to the present disclosure; FIGS. 9(*a*) and 9(*b*) are the three-dimensional phase distribution diagrams of the OAM convergence metasurface carrying topological charges 1 and 2, respectively.

REFERENCE NUMERALS

Figure 1:
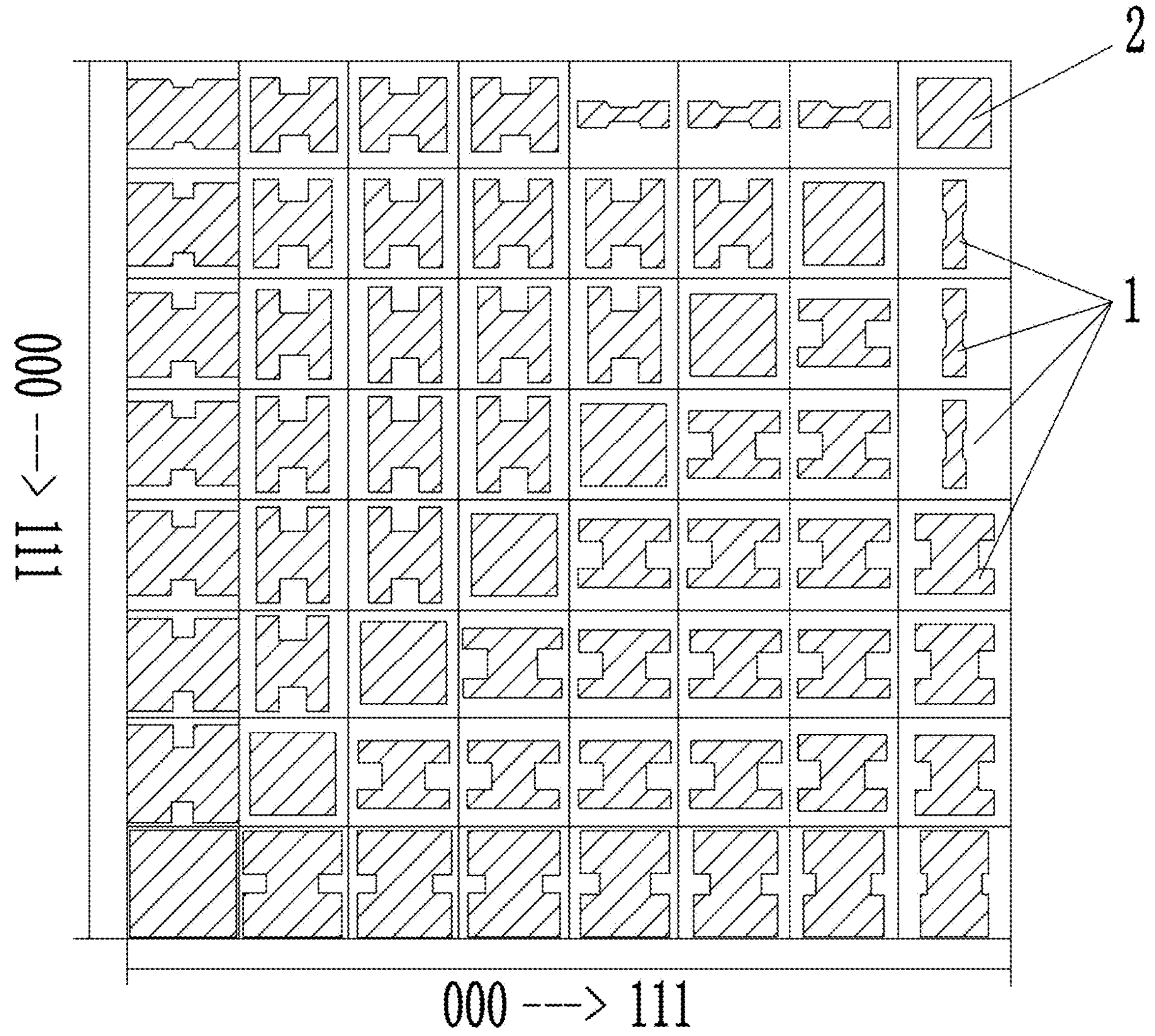
FIG. 1 is a schematic diagram of a base cell array constituting an OAM convergence metasurface according to the present disclosure.

1. anisotropic cell structure, 2. isotropic cell structure, 3. bottom ground layer, 4. dielectric substrate layer, and 5. top pattern layer.

DETAILED DESCRIPTION OF THE EMBODIMENTS

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The present disclosure aims to provide a dual-mode OAM base cell array and metasurface preparation method, so as to achieve dual-mode polarization regulation.

To make the above-mentioned objective, features, and advantages of the present disclosure clearer and more comprehensible, the present disclosure will be further described in detail below in conjunction with the accompanying drawings and specific embodiments.

Embodiment 1

The present disclosure provides a dual-mode OAM convergence base cell array, where the base cell array includes $2^n(2^n-1)$ anisotropic cell structures 1 and $2^n$ isotropic cell structures 2; and the base cell array has an array structure of $2^n \times 2^n$, n denoting a bit number. Each of the anisotropic cell structures 1 includes a bottom ground layer 3, a dielectric substrate layer 4 and a top pattern layer 5 which are disposed in sequence from bottom to top, where each top pattern layer 5 has an axisymmetric H-shaped structure. Each of the isotropic cell structures 2 includes a bottom ground layer 3, a dielectric substrate layer 4 and a top pattern layer 5 which are disposed in sequence from bottom to top, where each top pattern layer 5 has a square structure. According to the present disclosure, different anisotropic cell structures 1 have different H-shaped structure parameters. The bottom ground layer 3 and the top pattern layer 5 in each of the anisotropic cell structures 1 and the bottom ground layer 3 and the top pattern layer 5 in each of the isotropic cell structures 2 are all made of metal materials; the bottom ground layer 3 and the dielectric substrate layer 4 in each of the anisotropic cell structures 1 have a same cycle length, and the bottom ground layer 3 and the dielectric substrate layer 4 in each of the isotropic cell structures 2 have a same cycle length; and the dielectric substrate layer in each of the isotropic cell structures 2 and the dielectric substrate layer in each of the anisotropic cell structures 1 are both made of a low-loss material with a dielectric constant of 2.65.

In the present disclosure, n=3 is taken as an example for analysis. As shown in FIG. 1, the base cell array with reflective dual-function characteristics includes 56 anisotropic cell structures 1 and 8 isotropic cell structures 2; and the base cell array has an array structure of 8×8, and the 8 isotropic cell structures 2 are disposed on the diagonal of the array structure. The 64 base cell structures of the present disclosure can realize the phase difference of 360°, and the phase gradient between the adjacent base cell structures satisfies the relationship of $360°/2^n$ or $-360°/2^n$. For the base cell array anisotropically coded by 3 bits of information, a total of 64 base cell structures are required, of which 8 are isotropic cell structures 2 and 56 are anisotropic cell structures 1. Half of the total number of anisotropic cell structures 1 can be obtained by rotating the other half 90° along their central point, which greatly reduces the simulation complexity.

Figure 2A:
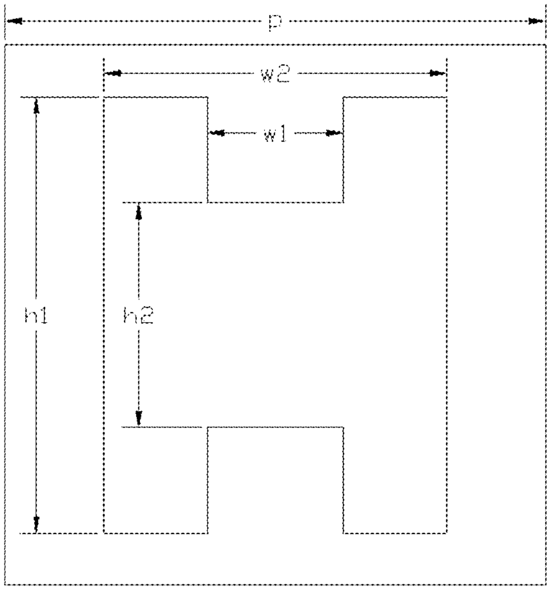
FIG. 2 is a schematic structural diagram of an anisotropic cell structure according to the present disclosure.
Figure 2B:
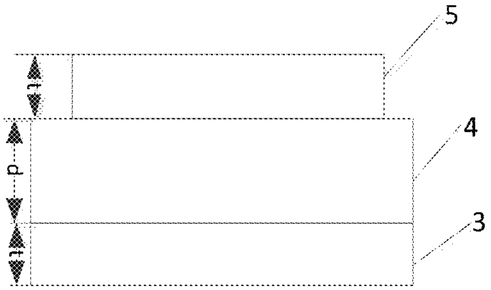

FIG. 2(*a*) shows a top view of an anisotropic cell structure, and FIG. 2(*b*) shows a front view of an anisotropic cell structure. As shown in FIG. 2, the anisotropic cell structure 1 includes a bottom ground layer 3, a dielectric substrate layer 4 and a top pattern layer 5 which are disposed in sequence from bottom to top; where the top pattern layer 5 has an axisymmetric H-shaped structure; the bottom ground layer 3 and the dielectric substrate layer 4 have a same cycle length p; the bottom ground layer 3 and the top pattern layer 5 are made of metal materials (generally copper) with high reflectivity, and the dielectric substrate layer is made of a low-loss material with a dielectric constant of 2.65. It should be noted that change in parameters h1 and h2 is sensitive to y polarized waves, while change in parameters w1 and w2 is sensitive to x polarized waves. That is, cell dimension parameters corresponding to various bit states in two polarization directions can be determined by optimization, and the dimension of each parameter in each of the anisotropic cell structures 1 is within the range of 0-6 mm. Additionally, the division of the bit states of coding units depends on the phase difference between the reflective anisotropic cell structures 1 or the isotropic cell structures 2. For example, for a base cell array coded by 1 bit of information, the phase difference between two adjacent anisotropic cell structures 1 or isotropic cell structures 2 is 180°; for a base cell array coded by 2 bits of information, the phase difference between two adjacent anisotropic cell structures 1 or isotropic cell structures 2 is 90°; for a base cell array coded by 3 bits of information, the phase difference between two adjacent anisotropic cell structures 1 or isotropic cell structures 2 is 45°; and for a base cell array coded by 4 bits of information, the phase difference between two adjacent anisotropic unit structures 1 or isotropic cell structures 2 is 22.5°.

Due to the non-centrosymmetry of anisotropic cell structures 1, there is a difference in two kinds of reflection phases under x and y polarization. Therefore, for the dielectric substrate layer of the anisotropic cell structure 1 designed in the present disclosure, F4B is selected, with a dielectric constant of 2.65, loss of 0.001, thickness d of merely 0.6 mm which is 3.2% of the operating wavelength, and a cycle p=6 mm. The bottom ground layer 3 and H-shaped metal structures are made of copper patches with a conductivity of $5.96\times10^7$ $Sm^{-1}$, and the thickness t is usually set to 0.018 mm.

Figure 3A:
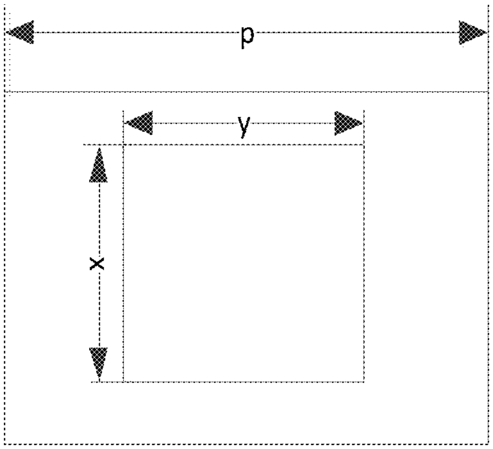
FIG. 3 is a schematic structural diagram of an isotropic cell structure according to the present disclosure.
Figure 3B:

FIG. 3(*a*) shows a top view of an isotropic cell structure 2, and FIG. 3(*b*) shows a front view of an isotropic cell structure 2. As shown in FIG. 3, the isotropic cell structure 2 includes a bottom ground layer 3, a dielectric substrate layer 4 and a top pattern layer 5 which are disposed in sequence from bottom to top, the top pattern layer 5 having a square structure. For the dielectric substrate layer of the anisotropic cell structure 2 in this embodiment, F4B is selected, with a dielectric constant of 2.65, loss of 0.001, thickness d of merely 0.6 mm which is 3.2% of the operating wavelength, and a cycle p=6 mm. The bottom ground layer 3 and H-shaped metal structures are made of copper patches with a conductivity of $5.96\times10^{7}$ $Sm^{-1}$, and the thickness t is usually set to 0.018 mm.

Embodiment 2

The present disclosure provides a dual-mode OAM convergence metasurface preparation method, including the following steps:

S1: determine, by optimization, optimal parameters corresponding to various bit states of each of $2^n$ $(2^n-1)$ anisotropic cell structures in two polarization directions based on a phase requirement of OAM for the anisotropic cell structures, where n denotes a bit number.

S1 specifically includes:

S11: conducting, by three-dimensional electromagnetic field simulation software CST, rough simulation on each of the anisotropic cell structures in two polarization directions to obtain a first rough phase value.

S12: conducting fine-tuning based on the first rough phase value until a first precise phase value is reached, where the specific formula is as follows:

$$\phi_{ith}^{a}=\begin{cases}0°, 337.5°<\phi_{ith}\le 360°, 0°<\phi_{ith}\le 22.5°\\ 45°, 22.5°<\phi_{ith}\le 67.5°\\ 90°, 67.5°<\phi_{ith}\le 112.5°\\ \vdots\\ 315°, 292.5°<\phi_{ith}\le 337.5°\end{cases}; \quad (1)$$

where ϕith denotes the first rough phase value, and $\phi_{ith}^{a}$ denotes the first precise phase value.

When is $\phi_{ith}^{a}$ is 0, the corresponding state is "000", when $\phi_{ith}^{a}$ is 45°, the corresponding state is "001", when $\phi_{ith}^{a}$ is 90°, the corresponding state is "010", and similarly, when $\phi_{ith}^{a}$ is 315°, the corresponding state is "111".

The base cell array coded by 1 bit of information corresponds to 2 kinds of coding states under x or y polarization, so the whole interval is equidistantly divided into 2 intervals. The base cell array coded by 2 bits of information corresponds to 4 kinds of coding states under x or y polarization, so the whole interval is equidistantly divided into 4 intervals; the base cell array coded by 3 bits of information corresponds to 8 kinds of coding states under x or y polarization, so the whole interval is equidistantly divided into 8 intervals. The base cell array coded by 4 bits of information corresponds to 16 kinds of coding states under x or y polarization, so the whole interval is equidistantly divided into 16 intervals; and so on.

S13: taking dimension parameters corresponding to the first precise phase value as optimal parameters of the anisotropic cell structure. In this embodiment, dimension parameters corresponding to the first precise phase value include parameters w1, w2, h1 and h2, as shown in FIG. 2.

S2: construct the $2^n$ $(2^n-1)$ anisotropic cell structures according to the optimal parameters corresponding to various bit states of the $2^n$ $(2^n-1)$ anisotropic cell structures in two polarization directions. In this embodiment, different anisotropic cell structures have different optimal parameters.

S3: determine, by optimization, optimal parameters corresponding to $2^n$ cell structures based on a phase requirement of OAM for the isotropic cell structures, which specifically includes:

S31: conducting, by three-dimensional electromagnetic field simulation software CST, rough simulation on each of the isotropic cell structures to obtain a second rough phase value.

S32: conducting fine-tuning based on the second rough phase value until a second precise phase value is reached; and S33: taking dimension parameters corresponding to the second precise phase value as optimal parameters of each of the isotropic cell structures; where dimension parameters corresponding to the second precise phase value include parameters x and y, and x is equal to y, as shown in FIG. 3.

As shown in FIG. 3, the isotropic cell structure includes a bottom ground layer, a dielectric substrate layer and a top pattern layer which are disposed in sequence from bottom to top; where the top pattern layer has a rectangular metal structure; the bottom ground layer and the dielectric substrate layer have a same cycle length p; the bottom ground layer and the top pattern layer are made of metal materials (generally copper) with high reflectivity, and the dielectric substrate layer is made of a low-loss material with a dielectric constant of 2.65.

S4: construct $2^n$ isotropic cell structures according to the optimal parameters corresponding to the $2^n$ isotropic cell structures.

S5: construct, based on the $2^n(2^n-1)$ anisotropic cell structures and the $2^n$ isotropic cell structures, the base cell array.

S6: derive a compensation phase φ□ of each of the base cell arrays of convergent vortex beams from free-space Helmholtz equation, where the specific formula is as follows:

$$\varphi=2\pi\left(\sqrt{(x^2+y^2)+F^2}-F\right)/\lambda+L\cdot\arctan(y/x) \quad (2);$$

where λ denotes wavelength in free space, L denotes topological charges of OAM, and can take any integer, F denotes focal length, namely the distance from a point source to a central point of a metasurface unit, and x and y denote position coordinates corresponding to a coding array, respectively. In addition, $2\pi(\sqrt{(x^2+y^2)+F^2}-F)/\lambda$ denotes input phase, and $L\cdot\arctan(y/x)$ denotes output phase.

In actual scenarios, to ensure the effect of producing near-field OAM vortex waves, a point source is usually used as an excitation source of a metasurface unit, so the distance from the point source to the central point of the metasurface unit is F=k*D; where k denotes a scale factor with a value range of 0.6-1, which usually takes the median value of 0.8, and D denotes the unilateral physical length of the base cell array, with a value of 246 mm.

Figure 4:
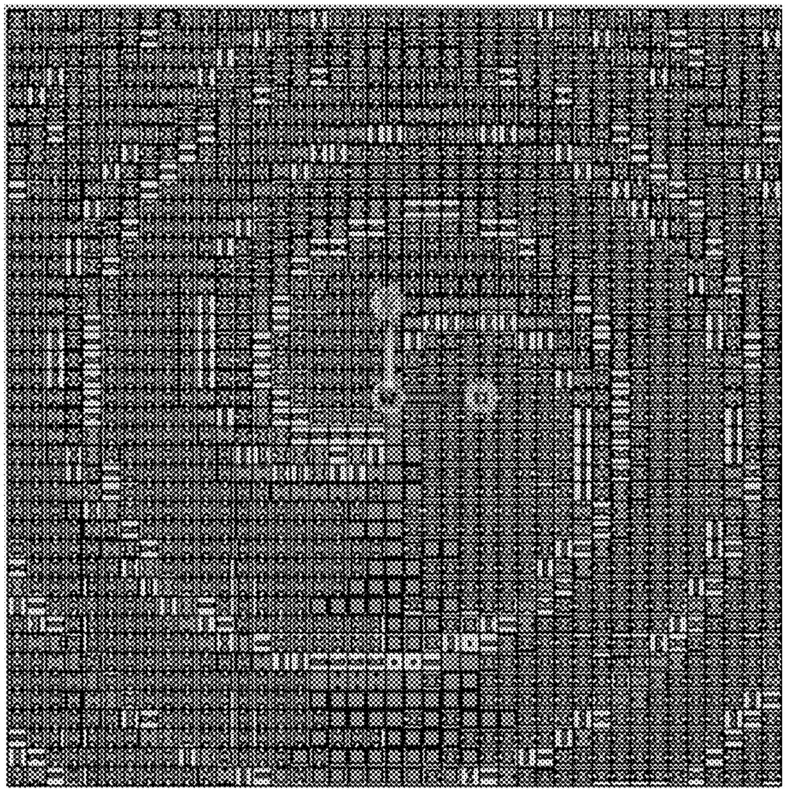
FIG. 4 is a schematic diagram of a dual-mode OAM convergence metasurface calculated by MATLAB according to the present disclosure.
Figures 5A, 5B, 5C:
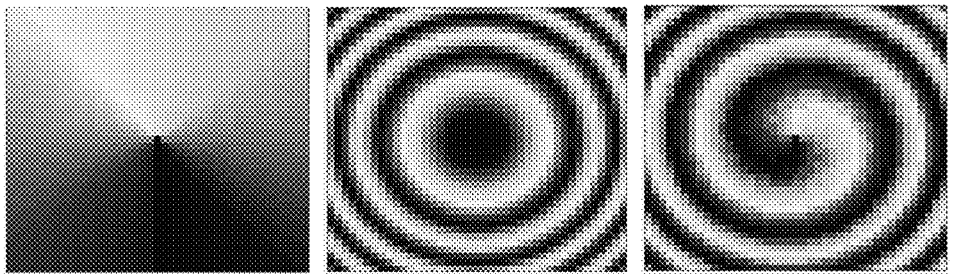
FIG. 5 is a schematic diagram illustrating distribution of the input phase, output phase and compensation phase of a dual-mode OAM convergence metasurface calculated by MATLAB according to the present disclosure.
Figure 5D:
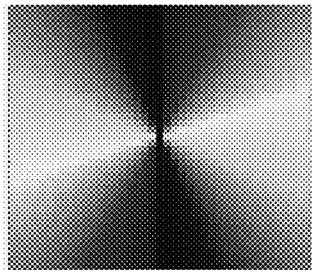
Figure 5E:
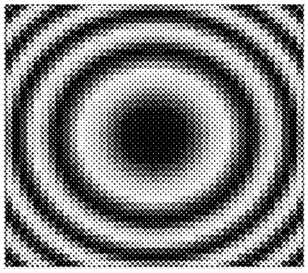
Figure 5F:
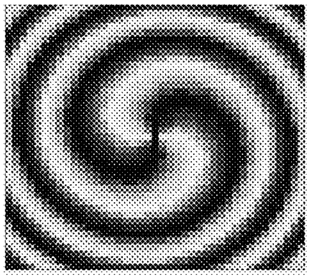

S7: construct, based on the compensation phase of each of the base cell arrays, an OAM convergence metasurface carrying different topological charges by MATLAB, as shown in FIG. 4. In the present disclosure, a polarization-regulated dual-mode OAM convergence metasurface with topological charges of 1 and 2 is designed, and the coupling among the base cell arrays is weakened by using the concept of cells. The overall dimension of the OAM convergence metasurface is about 16 times the operating wavelength, and the distance between a spherical wave source and the metasurface can be set to 10 to 16 times the operating wavelength, for which the median value is usually taken.

In the present disclosure, the excitation source can be set as a horn or a waveguide, and anisotropic cell structures and isotropic cell structures are adopted to construct a dual-mode OAM base cell array using CST simulation software. It should be noted that the manual construction of the required array will take a lot of time and energy, and it is impossible to ensure a zero error probability. Therefore, MATLAB and CST can be adopted for joint simulation modeling, so as to ensure the accuracy of modeling.

In the present disclosure, an OAM convergence metasurface antenna capable of carrying topological charges of 1 and 2 at the same time is designed. The antenna has a high gain (21.7 dBi at 16 GH Mode 1 and 20.8 dBi at 16 GH Mode 2) and a small divergence angle (6.5° at 16 GH Mode 1 and 10.6° at 16 GH Mode 2), where Mode 1 and Mode 2 correspond to the topological charges carried by the dual-function OAM antenna, respectively. It should be noted that the structure is simple in fabrication process and low in material cost, which makes it possible to achieve large-scale standardized production, and thus the ultra-thin OAM convergence metasurface with high efficiency and simple structure can be realized.

Embodiment 3

In this embodiment, an anisotropic cell structure is mainly divided into three layers, namely the bottom ground layer, the dielectric substrate layer and the top pattern layer; where the bottom ground layer and the dielectric substrate layer each have a cycle length of 6 mm, and the thickness of the dielectric substrate layer is only 0.6 mm, which is 3.2% of the operating wavelength; both the bottom ground layer and the top pattern layer are made of copper with a conductivity of $5.96\times10^7$ $Sm^{-1}$, the dielectric substrate layer is made of F4B with a dielectric constant of 2.65 and a loss of 0.001, and the overall size of the structure is 246 mm×246 mm ($13.12\lambda_0\times13.12\lambda_0$).

Step 1: according to the basic principle of geometrical optics, reflect and refract electromagnetic waves at an interface of two kinds of materials, so an anisotropic cell structure with anisotropy can be designed according to the response of a metasurface to phases of electromagnetic waves under different kinds of polarization; and model, simulate and optimize the anisotropic cell structure by CST. In the process of optimization, w1, w2, h1, and h2 in FIG. 2 are chosen as optimization variables. It should be noted that change in parameters h1 and h2 is sensitive to y polarized waves, while change in parameters w1 and w2 is sensitive to x polarized waves. That is, dimension parameters of anisotropic cell structures corresponding to various bit states in two polarization directions can be determined by optimizing corresponding parameters. By optimizing the corresponding four parameters in FIG. 2, corresponding 56 anisotropic cell structures anisotropically coded by 3 bits of information can be obtained. Then eight isotropic cell structures need to be obtained. After being acquired, all the cell structures are subject to quantization coding according to formula (1), and the vortex phase distribution diagram is acquired using MATLAB according to formula (2), which is shown in FIG. 5. FIGS. 5(*a*), 5(*b*) and 5(*c*) show the input phase distribution diagram, output phase distribution diagram and compensation phase distribution diagram of the OAM convergence metasurface under x polarization incidence of electromagnetic waves, respectively, and the topological charges carried by the metasurface are at 1st order. FIGS. 5(*d*), 5(*e*) and 5(*f*) show the input phase distribution diagram, output phase distribution diagram and compensation phase distribution diagram of the OAM convergence metasurface under y polarization incidence of electromagnetic waves, respectively, and the topological charges carried by the metasurface are at 2nd order. For example, the unit phase values corresponding to the coding states 000-001 correspond to 0° and 45° in the x and y polarization directions, respectively, and the dimension parameters of anisotropic cell structures can be queried from Table 1. As the base cell structures of the reflective base cell array are fully covered with metal at the bottom and adopt low-loss dielectric substrates, the reflection amplitude is close to 1, and therefore, only phase information needs to be focused on during design.

TABLE 1

Dimension parameters of anisotropic cell structures (unit: mm)

| | W1 | h2 | h1 | w2 | x - - - phase | y - - - phase |
|---|---|---|---|---|---|---|
| 000-000 | 0 | 6 | 6 | 6 | 0° | 0° |
| 000-001 | 1 | 3 | 5.5 | 5.98 | 0° | 45° |
| 000-010 | 1 | 3 | 5.19 | 5.98 | 0° | 90° |
| 000-011 | 1 | 3 | 4.98 | 5.98 | 0° | 135° |
| 000-100 | 1.2 | 3 | 4.92 | 5.98 | 0° | 180° |
| 000-101 | 1.2 | 3 | 4.73 | 5.98 | 0° | 225° |
| 000-110 | 1.2 | 3 | 4.53 | 5.98 | 0° | 270° |
| 000-111 | 1.15 | 3 | 3.8 | 5.98 | 0° | 315° |
| 001-001 | 0 | 5.45 | 5.45 | 5.45 | 45° | 45° |
| 001-010 | 1.5 | 2.5 | 5.51 | 3.96 | 45° | 90° |
| 001-011 | 1.5 | 2.5 | 5.37 | 4.02 | 45° | 135° |
| 001-100 | 1.52 | 2.48 | 5.27 | 4.05 | 45° | 180° |
| 001-101 | 1.52 | 2.48 | 5.14 | 4.13 | 45° | 225° |
| 001-110 | 1.52 | 2.48 | 4.9 | 4.28 | 45° | 270° |
| 001-111 | 1.52 | 2.48 | 4.08 | 4.82 | 45° | 315° |
| 010-010 | 0 | 5.13 | 5.13 | 5.13 | 90° | 90° |
| 010-011 | 1.6 | 2.56 | 5.43 | 3.83 | 90° | 135° |
| 010-100 | 1.63 | 2.62 | 5.32 | 3.93 | 90° | 180° |
| 010-101 | 1.63 | 2.62 | 5.21 | 4 | 90° | 225° |
| 010-110 | 1.63 | 2.62 | 4.97 | 4.13 | 90° | 270° |
| 010-111 | 1.61 | 2.62 | 4.15 | 4.62 | 90° | 315° |
| 011-011 | 0 | 4.97 | 4.97 | 4.97 | 135° | 135° |
| 011-100 | 1.63 | 2.56 | 5.35 | 3.77 | 135° | 180° |
| 011-101 | 1.59 | 2.61 | 5.22 | 3.89 | 135° | 225° |
| 011-110 | 1.57 | 2.6 | 4.98 | 4.01 | 135° | 270° |
| 011-111 | 1.57 | 2.6 | 4.25 | 4.43 | 135° | 315° |
| 100-100 | 0 | 4.86 | 4.86 | 4.86 | 180° | 180° |
| 100-101 | 1.68 | 2.51 | 5.3 | 3.68 | 180° | 225° |
| 100-110 | 1.64 | 2.53 | 5.05 | 3.83 | 180° | 270° |
| 100-111 | 1.67 | 2.53 | 4.28 | 4.26 | 180° | 315° |
| 101-101 | 0 | 4.74 | 4.74 | 4.74 | 225° | 225° |
| 101-110 | 1.55 | 2.48 | 5.05 | 3.72 | 225° | 270° |
| 101-111 | 1.53 | 2.48 | 4.27 | 4.16 | 225° | 315° |
| 110-110 | 0 | 4.54 | 4.54 | 4.54 | 270° | 270° |
| 110-111 | 1.55 | 2.5 | 4.32 | 3.98 | 270° | 315° |
| 111-111 | 0 | 3.97 | 3.97 | 3.97 | 315° | 315° |

Step 2: achieve the phase requirement of dual-function OAM based on the relevant theories of electromagnetic waves, and independently control the phase distribution of vortexes in x and y polarization directions to achieve a polarization-regulated dual-mode OAM convergence metasurface. In this case, the central operating frequency is 16 GHz, a waveguide or horn can be selected as a feed source, and the distance from the phase center of the feed source to the center of the metasurface is set to be 246 mm. Afterwards, based on the basic principle of generating OAM vortex beams and the phase compensation formula required for spherical waves equivalent plane waves, a required vortex phase distribution diagram is obtained by coding and drawing by MATLAB.

Figure 6A:
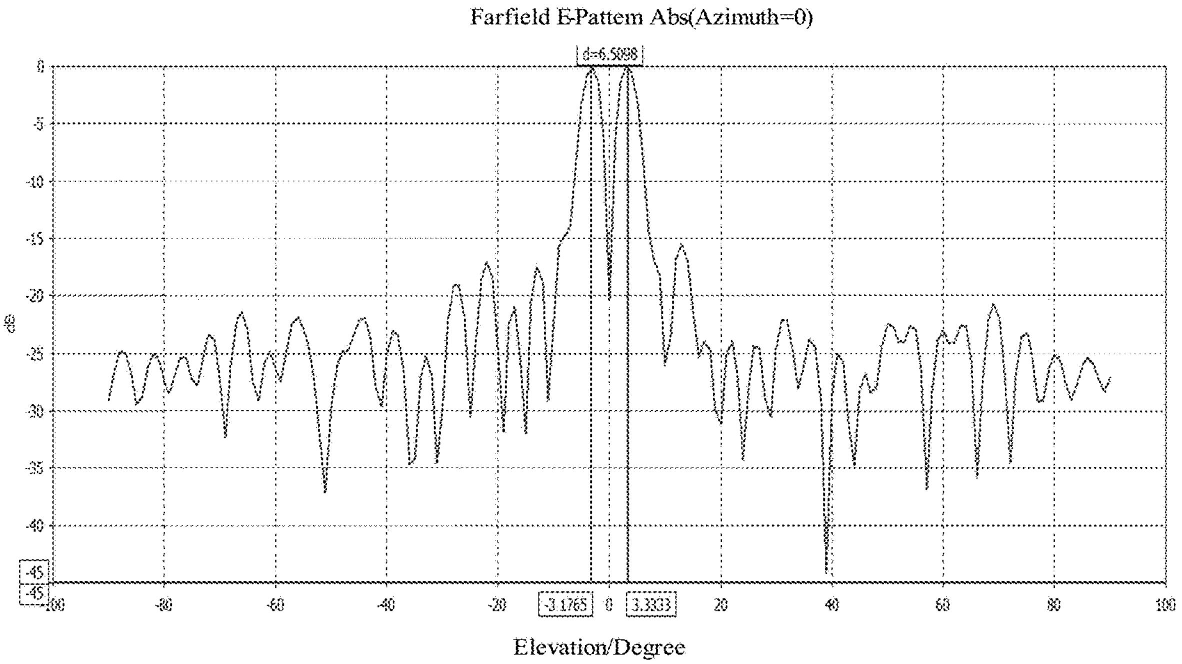
FIG. 6 is a two-dimensional far-field scattering diagram obtained via CST software simulation.
Figure 6B:
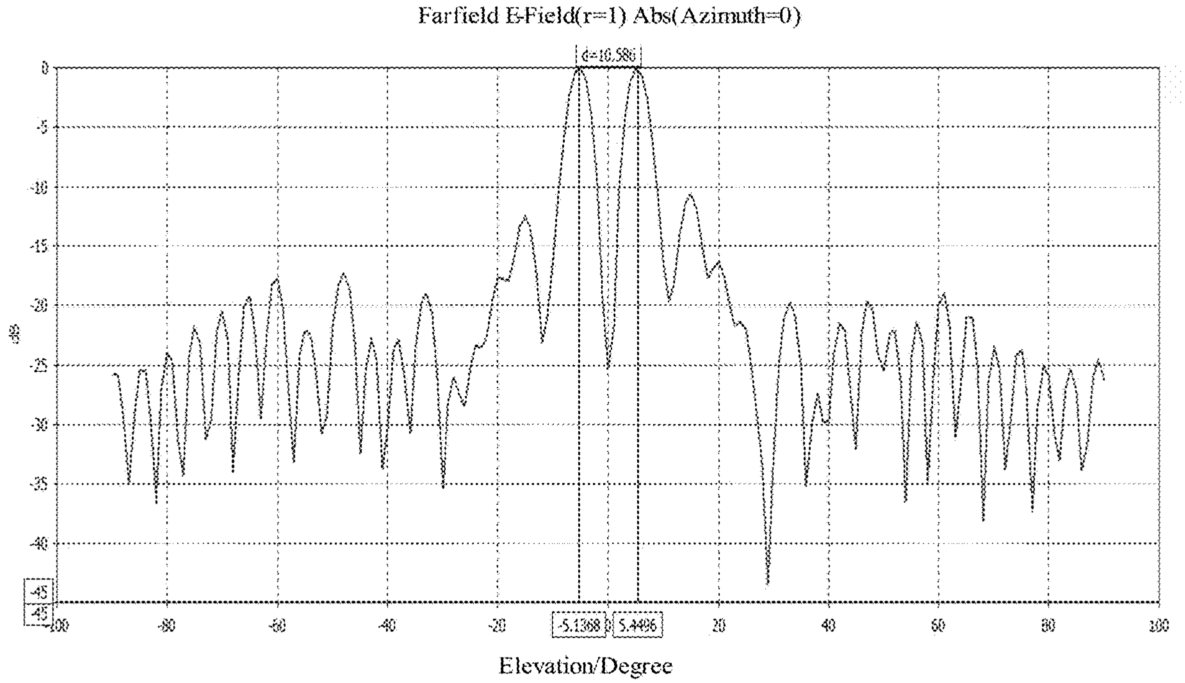
Figure 7A:
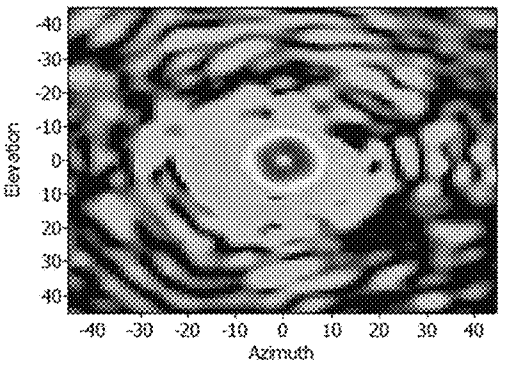
FIG. 7 is a schematic diagram illustrating OAM amplitude results produced by CST software simulation according to the present disclosure.
Figure 7:
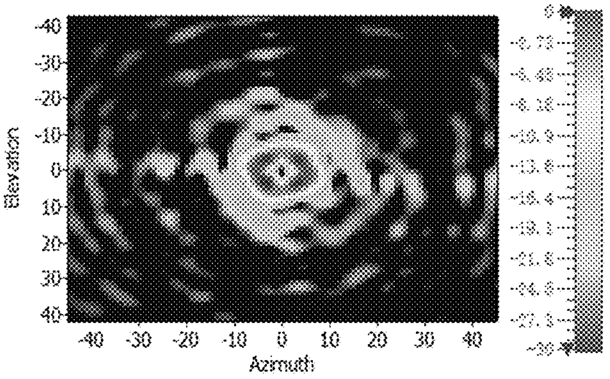

Step 3: according to the vortex phase distribution diagram solved by MATLAB in Step 2, construct a polarization-regulated dual-mode OAM convergence metasurface. In the present disclosure, MATLAB and CST are adopted for joint simulation modeling, and a model established is shown in FIG. 4. The designed metasurface has an operating frequency point of 16 GHz. In order to reduce simulation complexity, a suitable waveguide can be selected as a feed source, and the distance between the waveguide and the center of the metasurface is 246 mm, which is 13.12 times the operating wavelength. Afterwards, solved electric field amplitudes and phase are analyzed using CST, and the two-dimensional far-field scattering diagram, three-dimensional far-field scattering diagram, two-dimensional phase distribution diagram and three-dimensional phase distribution diagram are shown in FIGS. 6-9, respectively. FIG. 6 is a two-dimensional far-field scattering diagram obtained via CST software simulation, where FIGS. 6(*a*) and 6(*b*) show the two-dimensional far-field scattering diagrams drawn on the yoz plane based on the OAM convergence metasurfaces carrying topological charges 1 and 2, respectively; and as can be seen from FIG. 6, divergence angle d is about 6.5 when topological charge is 1, and divergence angle d is about 10.6 when topological charge is 1. FIG. 7 is a schematic diagram illustrating OAM amplitude results produced by CST software simulation according to the present disclosure. FIGS. 7(*a*) and 7(*b*) are the schematic diagrams illustrating amplitude results of the OAM convergence metasurface carrying topological charges 1 and 2 against the xoy plane at the position of 246 mm from Z-axis, respectively. FIG. 8 is a schematic diagram illustrating phase results corresponding to the dual-mode OAM convergence metasurface according to the present disclosure. FIGS. 8(*a*) and 8(*b*) are the schematic diagrams illustrating phase results corresponding to the OAM convergence metasurfaces carrying topological charges 1 and 2, respectively. FIG. 9 is a three-dimensional far-field scattering diagram of the polarization-regulated dual-mode OAM convergence metasurface according to the present disclosure. FIGS. 9(*a*) and 9(*b*) are the three-dimensional phase distribution diagrams of the OAM convergence metasurface carrying topological charges 1 and 2, respectively. As shown in FIG. 9, it is well verified that the designed OAM antenna has a high gain (21.4 dBi in 16 GH, Mode 1, and 20.3 dBi in 16 GH, Mode 2). As shown in FIG. 6, it is well verified that the designed OAM antenna has a small divergence angle (6.5° in 16 GH, Mode 1, and 10.6° in 16 GH, Mode 2). As shown in FIGS. 6-9, Mode 1 and Mode 2 correspond to the topological charges carried by the polarization-regulated dual-mode OAM convergence metasurface, respectively, and the theoretical prediction fit in well with simulation results.

Each embodiment of the present specification is described in a progressive manner, each embodiment focuses on the difference from other embodiments, and the same and similar parts between the embodiments may refer to each other.

In this specification, some specific embodiments are used for illustration of the principles and implementations of the present disclosure. The description of the foregoing embodiments is used to help illustrate the method of the present disclosure and the core ideas thereof. In addition, persons of ordinary skill in the art can make various modifications in terms of specific implementations and the scope of application in accordance with the ideas of the present disclosure. In conclusion, the content of the present description shall not be construed as limitations to the present disclosure.

What is claimed is:

1. A dual-mode orbital angular momentum (OAM) convergence base cell array, wherein the base cell array comprises $2^n(2^n-1)$ anisotropic cell structures and $2^n$ isotropic cell structures; and the base cell array has an array structure of $2^n \times 2^n$, n denoting a bit number;

each of the anisotropic cell structures comprises a bottom ground layer, a dielectric substrate layer and a top pattern layer which are disposed in sequence from bottom to top, the top pattern layer of the anisotropic cell structure having an axisymmetric H-shaped structure; and each of the isotropic cell structures comprises a bottom ground layer, a dielectric substrate layer and a top pattern layer which are disposed in sequence from bottom to top, the top pattern layer of the isotropic cell structure having a square structure.

2. The dual-mode OAM convergence base cell array according to claim 1, wherein different anisotropic cell structures have different H-shaped structure parameters.

3. The dual-mode OAM convergence base cell array according to claim 1, wherein the bottom ground layer and the top pattern layer in each of the anisotropic cell structures and the bottom ground layer and the top pattern layer in each of the isotropic cell structures are all made of metal materials, and the dielectric substrate layer in each of the anisotropic cell structures and the dielectric substrate layer in each of the isotropic cell structures are both made of a material with a dielectric constant of 2.65.

4. The dual-mode OAM convergence base cell array according to claim 1, wherein the bottom ground layer and the dielectric substrate layer in each of the anisotropic cell structures have a same cycle length, and the bottom ground layer and the dielectric substrate layer in each of the isotropic cell structures have a same cycle length.

5. A dual-mode OAM convergence metasurface preparation method, comprising:

determining, by optimization, optimal parameters corresponding to various bit states of each of $2^n$ $(2^n-1)$ anisotropic cell structures in two polarization directions based on a phase requirement of OAM for the anisotropic cell structures, wherein n denotes a bit number;

constructing the $2^n$ $(2^n-1)$ anisotropic cell structures according to the optimal parameters corresponding to various bit states of the $2^n$ $(2^n-1)$ anisotropic cell structures in two polarization directions;

determining, by optimization, optimal parameters corresponding to $2^n$ isotropic cell structures based on a phase requirement of OAM for the isotropic cell structures;

constructing the $2^n$ isotropic cell structures according to the optimal parameters corresponding to the $2^n$ isotropic cell structures;

constructing, based on the $2^n$ $(2^n-1)$ anisotropic cell structures and the $2^n$ isotropic cell structures, the base cell array according to claim 1;

deriving a compensation phase of each base cell array of convergent vortex beams from free-space Helmholtz equation; and constructing, based on the compensation phase of each of the base cell arrays, an OAM convergence metasurface carrying different topological charges by MATLAB.

6. The dual-mode OAM convergence metasurface preparation method according to claim 5, wherein different anisotropic cell structures have different H-shaped structure parameters.

7. The dual-mode OAM convergence metasurface preparation method according to claim 5, wherein the bottom ground layer and the top pattern layer in each of the anisotropic cell structures and the bottom ground layer and the top pattern layer in each of the isotropic cell structures are all made of metal materials, and the dielectric substrate layer in each of the anisotropic cell structures and the dielectric substrate layer in each of the isotropic cell structures are both made of a material with a dielectric constant of 2.65.

8. The dual-mode OAM convergence metasurface preparation method according to claim 5, wherein the bottom ground layer and the dielectric substrate layer in each of the anisotropic cell structures have a same cycle length, and the bottom ground layer and the dielectric substrate layer in each of the isotropic cell structures have a same cycle length.

9. The dual-mode OAM convergence metasurface preparation method according to claim 5, wherein the determining, by optimization, optimal parameters corresponding to various bit states of each of $2^n$ $(2^n-1)$ anisotropic cell structures in two polarization directions based on a phase requirement of OAM for the anisotropic cell structures specifically comprises:

conducting, by three-dimensional electromagnetic field simulation software CST, rough simulation on each of the anisotropic cell structures in two polarization directions to obtain a first rough phase value;

conducting fine-tuning based on the first rough phase value until a first precise phase value is reached; and taking dimension parameters corresponding to the first precise phase value as optimal parameters of the anisotropic cell structure.

10. The dual-mode OAM convergence metasurface preparation method according to claim 6, wherein the determining, by optimization, optimal parameters corresponding to various bit states of each of $2^n$ $(2^n-1)$ anisotropic cell structures in two polarization directions based on a phase requirement of OAM for the anisotropic cell structures specifically comprises:

conducting, by three-dimensional electromagnetic field simulation software CST, rough simulation on each of the anisotropic cell structures in two polarization directions to obtain a first rough phase value;

conducting fine-tuning based on the first rough phase value until a first precise phase value is reached; and taking dimension parameters corresponding to the first precise phase value as optimal parameters of the anisotropic cell structure.

11. The dual-mode OAM convergence metasurface preparation method according to claim 7, wherein the determining, by optimization, optimal parameters corresponding to various bit states of each of $2^n$ $(2^n-1)$ anisotropic cell structures in two polarization directions based on a phase requirement of OAM for the anisotropic cell structures specifically comprises:

conducting, by three-dimensional electromagnetic field simulation software CST, rough simulation on each of the anisotropic cell structures in two polarization directions to obtain a first rough phase value;

conducting fine-tuning based on the first rough phase value until a first precise phase value is reached; and taking dimension parameters corresponding to the first precise phase value as optimal parameters of the anisotropic cell structure.

12. The dual-mode OAM convergence metasurface preparation method according to claim 8, wherein the determining, by optimization, optimal parameters corresponding to various bit states of each of $2^n$ $(2^n-1)$ anisotropic cell structures in two polarization directions based on a phase requirement of OAM for the anisotropic cell structures specifically comprises:

conducting, by three-dimensional electromagnetic field simulation software CST, rough simulation on each of the anisotropic cell structures in two polarization directions to obtain a first rough phase value;

conducting fine-tuning based on the first rough phase value until a first precise phase value is reached; and taking dimension parameters corresponding to the first precise phase value as optimal parameters of the anisotropic cell structure.

13. The dual-mode OAM convergence metasurface preparation method according to claim 5, wherein the determining, by optimization, optimal parameters corresponding to each of $2^n$ isotropic cell structures based on a phase requirement of OAM for the isotropic cell structures specifically comprises:

conducting, by three-dimensional electromagnetic field simulation software CST, rough simulation on each of the isotropic cell structures to obtain a second rough phase value;

conducting fine-tuning based on the second rough phase value until a second precise phase value is reached; and taking dimension parameters corresponding to the second precise phase value as optimal parameters of each of the isotropic cell structures.

14. The dual-mode OAM convergence metasurface preparation method according to claim 6, wherein the determining, by optimization, optimal parameters corresponding to each of $2^n$ isotropic cell structures based on a phase requirement of OAM for the isotropic cell structures specifically comprises:

conducting, by three-dimensional electromagnetic field simulation software CST, rough simulation on each of the isotropic cell structures to obtain a second rough phase value;

conducting fine-tuning based on the second rough phase value until a second precise phase value is reached; and taking dimension parameters corresponding to the second precise phase value as optimal parameters of each of the isotropic cell structures.

15. The dual-mode OAM convergence metasurface preparation method according to claim 7, wherein the determining, by optimization, optimal parameters corresponding to each of $2^n$ isotropic cell structures based on a phase requirement of OAM for the isotropic cell structures specifically comprises:

conducting, by three-dimensional electromagnetic field simulation software CST, rough simulation on each of the isotropic cell structures to obtain a second rough phase value;

conducting fine-tuning based on the second rough phase value until a second precise phase value is reached; and taking dimension parameters corresponding to the second precise phase value as optimal parameters of each of the isotropic cell structures.

16. The dual-mode OAM convergence metasurface preparation method according to claim 8, wherein the determining, by optimization, optimal parameters corresponding to each of $2^n$ isotropic cell structures based on a phase requirement of OAM for the isotropic cell structures specifically comprises:

conducting, by three-dimensional electromagnetic field simulation software CST, rough simulation on each of the isotropic cell structures to obtain a second rough phase value;

conducting fine-tuning based on the second rough phase value until a second precise phase value is reached; and taking dimension parameters corresponding to the second precise phase value as optimal parameters of each of the isotropic cell structures.

17. The dual-mode OAM convergence metasurface preparation method according to claim 9, wherein the conducting fine-tuning based on the first rough phase value until a first precise phase value is reached is conducted according to the following formula:

$$\phi_{ith}^{a} = \begin{cases} 0°, 337.5° < \phi_{ith} \leq 360°, 0° < \phi_{ith} \leq 22.5° \\ 45°, 22.5° < \phi_{ith} \leq 67.5° \\ 90°, 67.5° < \phi_{ith} \leq 112.5° \\ \vdots \\ 315°, 292.5° < \phi_{ith} \leq 337.5° \end{cases}$$

wherein $\phi$ith denotes the first rough phase value, and $\phi_{ith}^{a}$ denotes the first precise phase value.

18. The dual-mode OAM convergence metasurface preparation method according to claim 9, wherein the deriving a compensation phase of each base cell array of convergent vortex beams from free-space Helmholtz equation is conducted according to the following formula:

$$\varphi = 2\pi(\sqrt{(x^2+y^2)+F^2} - F)/\lambda + L \cdot \arctan(y/x)$$

wherein, $\varphi$ denotes a compensation phase of each of the base cell arrays of convergent vortex beams, $\lambda$ denotes wavelength in free space, L denotes topological charges of OAM, F denotes focal length, and x and y denote position coordinates corresponding to a coding array, respectively.

* * * * *